(12) United States Patent
Smolong et al.

(10) Patent No.: US 7,845,470 B2
(45) Date of Patent: Dec. 7, 2010

(54) LUBRICATING DEVICE

(75) Inventors: Michael Smolong, Hamburg (DE);
Roland Herber, Saarbrücken (DE);
Armin Schmidt, Saarbrucken (DE)

(73) Assignee: Hydac Filtertechnik GmbH,
Sulzbach/Saar (DE)

( * ) Notice: Subject to any disclaimer, the term of this patent is extended or adjusted under 35 U.S.C. 154(b) by 1066 days.

(21) Appl. No.: 10/544,222

(22) PCT Filed: Feb. 5, 2004

(86) PCT No.: PCT/EP2004/001042
§ 371 (c)(1),
(2), (4) Date: Aug. 2, 2005

(87) PCT Pub. No.: WO2004/070231
PCT Pub. Date: Aug. 19, 2004

(65) Prior Publication Data
US 2006/0137939 A1    Jun. 29, 2006

(30) Foreign Application Priority Data
Feb. 7, 2003   (DE)   ................................ 203 01 924

(51) Int. Cl.
*F16H 57/04* (2010.01)
*F01M 1/00* (2006.01)
(52) U.S. Cl. .................. 184/6.12; 184/11.3; 184/13.1; 74/467
(58) Field of Classification Search ................ 184/6.12, 184/6.13, 11.1, 11.2, 11.3, 13.1; 74/606 R, 74/467, 468; 475/159, 160
See application file for complete search history.

(56) References Cited

U.S. PATENT DOCUMENTS

| 1,554,081 | A | | 9/1925 | Garrett |
| 3,852,998 | A | * | 12/1974 | Leeson ........................ 74/63 |
| 4,420,990 | A | * | 12/1983 | Hauser ..................... 74/606 R |
| 4,590,820 | A | * | 5/1986 | Hambric ..................... 74/640 |
| 4,658,665 | A | | 4/1987 | Strinzel et al. |
| 4,693,133 | A | * | 9/1987 | Tomita et al. ................. 74/467 |
| 5,161,644 | A | * | 11/1992 | Swenskowski et al. ..... 184/6.12 |
| 5,279,391 | A | * | 1/1994 | Ward ........................ 184/6.12 |
| 5,324,176 | A | * | 6/1994 | Farrell ........................ 417/364 |
| 5,809,845 | A | | 9/1998 | Shimizu |

(Continued)

FOREIGN PATENT DOCUMENTS

DE   101 05 612 A1   8/2002

(Continued)

*Primary Examiner*—Bradley T King
*Assistant Examiner*—Thomas Irvin
(74) *Attorney, Agent, or Firm*—Roylance, Abrams, Berdo & Goodman, LLP

(57) ABSTRACT

A lubricating device for gear trains (10), especially for wind power stations, includes at least two gear stages (16,18) that are disposed next to each other and are effectively interconnected, and a lubricant circuit (20) into which at least one filter unit (26) is mounted. To prevent stagnant resting zones for the lubricant from being created within the gear train housing including the gear stages, while ensuring that the entire lubricant that circulates in the gear stages is fed to the filter unit to be drawn off and filtered within predefined periods of time, the lubricant circulating inside the lubricant circuit (20) is discharged at one gear stage (18), is drawn off through the filter unit, and can then be fed to the other gear stage (16).

10 Claims, 1 Drawing Sheet

U.S. PATENT DOCUMENTS

| | | | |
|---|---|---|---|
| 6,299,561 B1 * | 10/2001 | Kramer et al. | 475/160 |
| 6,374,951 B1 * | 4/2002 | Michelhaugh et al. | 184/13.1 |
| 6,420,808 B1 * | 7/2002 | Hosle | 310/83 |
| 6,607,464 B1 * | 8/2003 | Bauer et al. | 475/269 |
| 7,279,091 B2 * | 10/2007 | Sann et al. | 210/130 |
| 2002/0053489 A1 * | 5/2002 | Schnitzer | 184/6.12 |
| 2003/0000789 A1 * | 1/2003 | Inoue et al. | 192/3.26 |
| 2004/0074827 A1 * | 4/2004 | Sann et al. | 210/132 |
| 2006/0054410 A1 * | 3/2006 | Nakamura et al. | 184/6.12 |

FOREIGN PATENT DOCUMENTS

| | | |
|---|---|---|
| EP | 0 024 697 A1 | 3/1981 |
| WO | WO 02/062447 * | 8/2002 |

\* cited by examiner

LUBRICATING DEVICE

FIELD OF THE INVENTION

The present invention relates to a lubricating device for gear trains, especially for wind power stations, with at least two gear stages located next to one another, and dynamically connected to one another, and a lubricant circuit having at least one filter unit.

BACKGROUND OF THE INVENTION

Lubrication devices for gear trains in wind power stations are known and readily available on the market. In the manner of closed circulating lubrication, the lubricant, especially in the form of lubricating oil, is removed by gear oil pumps from the gear sump of the gear housing with the gear stages, supplied to filtering by the filter unit, for filtering, and discharged again to the interior of the gear housing to remove fouling, including in the form of metal shavings, from the lubricant. In spite of these measures, premature damage to the gears, which often occurs after six months, takes place in practical applications, both within the planet stage and on the spur wheel stage generally forming the two gear stages for the rotor of a wind power station. In particular, the planet stage often fails due to defective planet bearings, as do the gear oil pumps of wind power stations due to metal shavings which occur with increased frequency in the lubricant circuit. The reason for such failures is that within the spur wheel stage, due to the formation of resting zones with large areas for the lubricant (oil), it becomes possible for heavy metal particles to settle in those resting zones. Often lubricant or oil exchange takes place only in the area of the spur wheel stage so that lubricant exchange takes place only conditionally, and contaminated or dirty lubricant can remain on the sides of the planet stage and can cause damage there.

SUMMARY OF THE INVENTION

An object of the present invention is to provide improved lubrication devices that are reliable and economical in use, and ensure long-lasting gear train operation, thereby contributing to increasing the time between expensive maintenance intervals.

This object is basically achieved by a lubrication device where, on one gear stage, the lubricant circulating in the lubricant circuit is drawn off, cleaned by the filter unit and then delivered to the respective other gear stage. Stationary resting or stagnation zones for the lubricant within the gear housing with the gear stages are avoided. In definable time intervals, all the lubricant circulating in the gear stages is delivered to the filter unit to be cleaned and filtered by it. For an average person skilled in the art in the area of lubrication devices, especially in the area of wind power stations, it comes as a surprise that, with the measure of permanent circulation while avoiding stationary resting zones in the lubricant or gear oil bath, improved possibility for cleaning the lubricant flow by the filter unit is obtained. In particular, the heavy metal particles which otherwise settle can be continuously supplied to the circulation process. This ability leads to relief of the gear oil pumps and ultimately also of the gear stages, from which serious contaminants are removed. The pumps and gear stages can then perform their functions for a long time. The improved lubricant delivery at the respective gear stage also contributes to the extended performance.

In one preferred embodiment of the lubrication device of the present invention, provision is made such that in order to implement splash lubrication, the gear stages each individually and at least partially pass through a type of immersion bath with a lubricant reserve. The lubricant reserve has a subdivision such that each gear stage is assigned its own bath area. Preferably, the subdivision and the lubricant amount in the immersion bath are chosen such that overflowing lubricant from one gear stage with lubricant supply travels to the bath area of the following gear stage with lubricant removal. This configuration provides optimum lubrication of the gear stages within the immersion bath of the lubricant, while still ensuring that within the immersion bath lubricant displacement and the respective continuous drawing off take place. Removal of fouling from the lubricant or gear oil bath is then achieved continuously.

In another, especially preferred embodiment of the lubrication device of the present invention, lubricant removal includes of a suction device, and the lubricant supply includes an injection device. In the gear housing for the respective gear stage, the indicated devices are mounted diagonally opposite one another, extending through the upper and lower area of the housing. Due to this diagonal configuration, optimum lubricant distribution within the gear stages takes place. The transit time for the lubricant between the gear stages from the injection side to the suction side is likewise optimized.

Preferably, the gear stage comprises a planet gear and a spur gear. By the planet gear, it is possible to bring the rotor of the wind power station with its low rpm to higher rpm as required, to drive a generator for generating current or the like by the spur gear, in the known manner. For long-lasting and good lubricant operation, it has proven favorable to provide injection of a cleaned lubricant for the planet gear and to implement suction for contaminated lubricant on the spur gear stage.

The filter unit used preferably in the lubrication device in the direction of lubricant delivery has a fine filter which is safeguarded with a bypass, followed by a coarse filter connected downstream in series. Cleaning results are especially good when the filter fineness of the coarse filter is chosen to be approximately 5 to 10 times coarser than the filter fineness of the fine filter. Such a preferably suitable filter unit is described in DE 101 05 612 A1 of Hydac Filtertechnik GmbH.

The lubrication device of the present invention need not be limited to gear stages in wind power stations. It can also be used for other gear stages and gear configurations, with and without planet gears.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
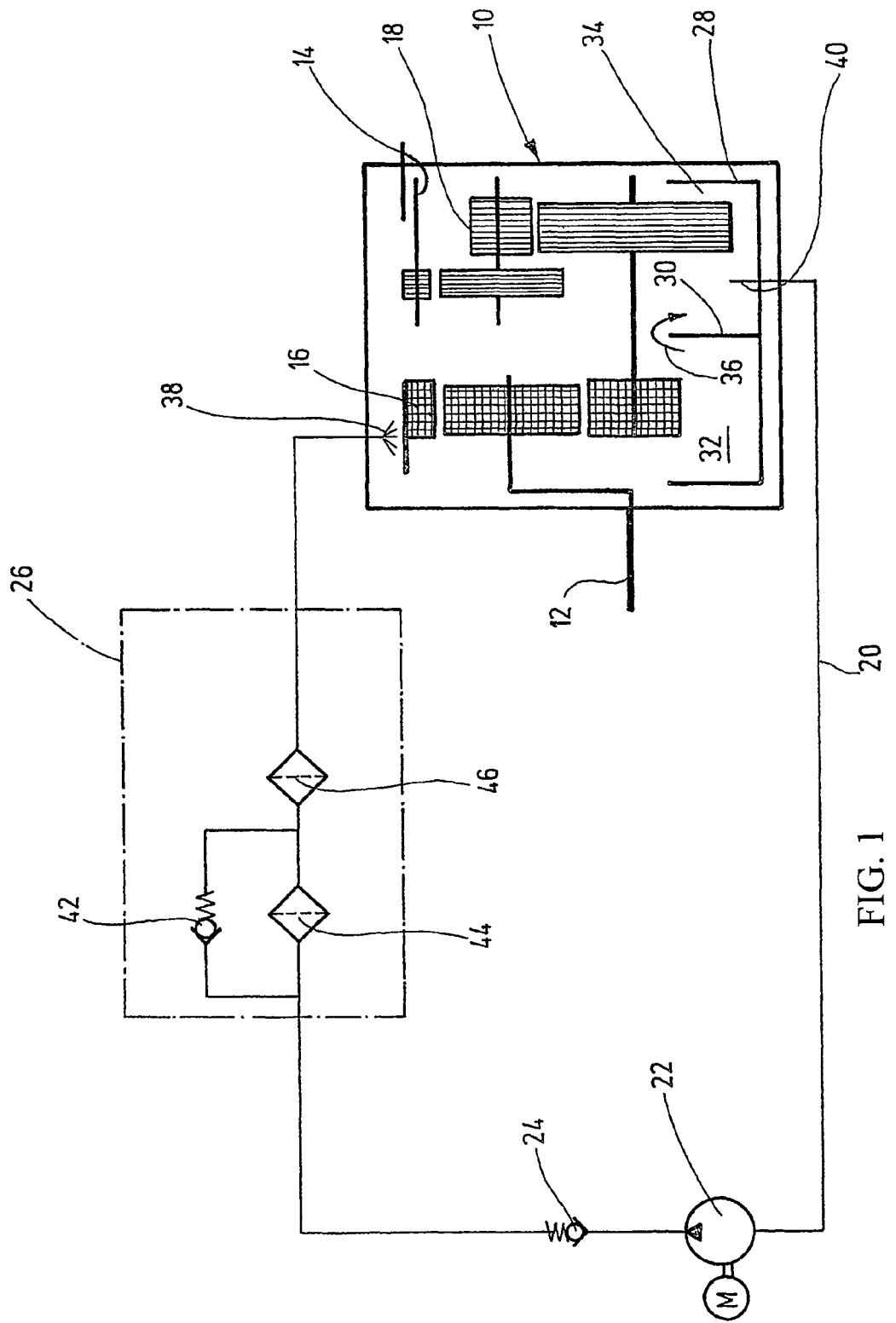
FIG. 1 is a schematic, block diagram, not to scale, of a lubrication device according to an embodiment of the present invention.

The lubrication device is used for a gear train 10. The gear train 10 shown in FIG. 1 is used in so-called wind power stations, in which a rotor (not shown), driven by the force of the wind, delivers its output power to an input shaft 12. After passing through the gear train 10 the respective output power is delivered to an output shaft 14 which, for example, can be connected to a generator (not shown) for generating electrical current. Since the rotor generally has very low rpm and the generator operation requires correspondingly higher input rpm, the gear train provides a step-up ratio from low to high rpm by a factor i of for example 1:80. The pertinent gear train assemblies for wind power stations are conventional, and need not be described in further detail.

Such gear trains generally have two gear stages 16, 18, with each gear stage having several stage parts. In particular, the first gear stage 16 includes planet gear and the second gear stage 18 includes a spur gear, with those stages also being referred to as the planet stage and the spur stage, respectively. The lubrication device of the present invention, in the manner of a closed circle or loop, has a lubricant circuit 20. To propel the lubricant, a conventional motor pump unit 22 is used, and is subsequently safeguarded in the lubricant delivery or downstream direction by a check valve 24 of conventional design. A filter unit 26 is connected subsequently or downstream between the motor pump unit 22 and the two gear stages 16, 18.

As illustrated in the block diagram, on the second gear stage 18, the lubricant circulating in the lubricant circuit 20 is removed and then is supplied via the motor pump unit 22 to the filter unit 26 before the lubricant cleaned in this way is then supplied to the first gear stage 16. The lubricant circulation can be carried out independently of whether the rotor and accordingly the gear train 10 are in operation or not. In this manner, by a control which is not detailed, the lubricant can be cleaned even if the system itself is shut down, for example because, with respect to the prevailing wind, operation of the system would not be profitable.

To implement splash lubrication for gear stages 16, 18 an immersion bath 28 is provided having a definable lubricant reserve and into which the gear stages 16, 18 with their gear wheels are at least partially immersed. A subdivision 30 is placed in the immersion bath 28, with each gear stage 16, 18 thus being assigned its own bath area 32, 34 in the process. In particular, the subdivision 30 and the lubricant amount in the immersion bath 28 are chosen such that the overflowing lubricant 36 (see arrow representation) travels from first gear stage 16 with lubricant supply 38 to the second bath area 34 with the following gear stage 18 with lubricant removal or outlet 40 of the immersion bath 28.

In the selected embodiment, the lubricant removal 40 is formed with a suction device, while the lubricant supply 38 is formed with an injection device. The suction and injection actions are adjustable by the working capacity of the motor pump unit 22. In particular, the indicated injection device is configured such that, for the purposes of a spraying-on process, parts of the first gear stage 16 are covered or fogged with the lubricant over a large area.

As also illustrated in FIG. 1, in the gear housing 10 for the respective gear stages 16, 18, the devices 38, 40 are mounted diagonally opposite one another. The lubricant supply 38 extends through the upper part of the housing 10. The lubricant removal 40, in the form of a suction device, penetrates the housing area from the housing bottom. With respect to the diagonal configuration, it basically is also possible in one embodiment, which is not detailed, to supply the injection amount to the top of the spur wheel stage and to implement suction on the bottom of the planet stage. Since the planet stage in terms of its support is highly susceptible to fouling, it has proven advantageous to implement the diagonal arrangement. As already described, diagonal fluid guidance is promoted and improved in that the overflowing lubricant 36 is relayed from one bath area 32 into the other bath area 34 and then is available to a filtration process by the filter unit 26.

Sedimentation or settling, especially of heavy fouling components such as metal shavings or the like, in the bath area 32 is thus effectively controlled.

The filter unit 26 can be provided with a filter element. It has proven advantageous to provide a fine filter 44 safeguarded with a bypass 42 (spring-loaded check valve) in the lubricant delivery direction, followed by a coarse filter 46 connected downstream in series. In normal operation, the fine filter 44 performs removal of fouling in the lubricant circuit 20. If the fine filter fail 44 fails, especially should it be clogged with dirt, the bypass valve 42 opens and to then supply the fluid flow to the coarse filter 46. Coarser dirt is then retained by the coarse filter 46 and cannot penetrate into the gear train 10 with its gear stages 16, 18 to cause damage. It has been found to be especially favorable for this application if the coarse filter is designed to be 10 times more coarse than the filter stage of the fine filter 44. Thus, the fine filter 44 can have a filter fineness of 5 μm and the coarser protective filter can have a filter fineness of 50 μm particle size. The pertinent, series-connected filter stages are prior art and it has proven especially effective to use filter units 26 according to DE 101 05 612 A1 (corresponding to U.S. Pat. No. 7,279,091).

By a combination of suction from the oil sump on the spur wheel area and injection of lubricant into the planet stage after cleaning by the filter unit 26, lubricant supply for the gear train parts of wind power stations is achieved which ensures reliable and long-lasting, trouble-free operation even under harsh ambient conditions and with hard use.

The lubricant device of the present invention can be used by itself as a modular unit. It can also be installed as an additional system to standard circulation lubrication or to immersion bath lubrication. Furthermore, the possibility also exists of integrating an additional intake filter or intake screen (not shown) in the intake line to the motor pump unit 22 to protect the hydraulic pump against damage caused by dirt. Analysis of the contents of an intake screen yields conclusions regarding wear processes in the gear train. The subdivision of the bath areas within the gear housing can also be formed by ribs or stiffeners of the gear housing. The planet stage 16 shown in FIG. 1 has so-called planet wheels which revolve around the sun wheel shown lowermost in the FIGURE. As viewed in the FIGURE, the internal geared wheel is shown uppermost. The structure of the planet gearing is conventional so that it will not be described in further detail.

As shown in FIG. 1, a gear stage or planet stage 16 forms the planet gearing or the so-called planet part of the gear train. Conversely, two gear stage or spur wheel stages 18 form the actual spur gear which is also called the spur part of the gear train. The diagonal lubrication concept of the present invention for the lubrication device can also be used for gear trains with a different number of gear stages. The check valve 24 inserted downstream from the pump 22 is optional, and not absolutely necessary. In particular the pertinent check valve 24 would be suited for pressure limitation. The oil flow from the check valve could then be routed to the intake side of the pump (not shown).

What is claimed is:
1. A lubricating device, comprising:
   first and second gear stages mounted next to one another and dynamically connected to one another, said first gear stage having a planet gear, said second gear stage having a spur gear;
   a lubricant circuit having at least one filter therein, having a lubricant supply for providing lubricant to said first gear stage, having a lubricant removal for removing lubricant from said second gear stage, and circulating lubricant drawn from said lubricant removal to said filter for cleaning and then to said lubricant supply; and an immersion bath receiving individually and at least partially each of said gear stages for said gear stages to pass through said immersion bath for splash lubrication of said gear stages, said immersion bath having a lubricant reserve and a subdivision separating said immersion bath into first and second bath areas for said first and second gear stages, respectively, said subdivision having a configuration and said lubricant reserve having an amount such that lubricant overflows said subdivision to be conveyed from said first bath area to said second bath area, said first bath area having said lubricant supply, said second bath area having said lubricant removal.

2. A lubricating device according to claim 1 wherein said first and second gear stages are parts of a wind power station.

3. A lubricating device according to claim 1 wherein
said lubricant removal comprises a suction device;
said lubricant supply comprises an injection device; and
said first and second gear stages are mounted in a gear housing with said injection device and said suction device being located diagonally opposite one another in an upper area and a lower area, respectively, of said housing.

4. A lubricating device according to claim 3 wherein said lubricant circuit comprises a motor pump unit conveying lubricant through said injection device, said suction device and said filter.

5. A lubricating device according to claim 4 wherein said filter is mounted between said motor pump unit and said gear housing in said lubricant circuit.

6. A lubricating device according to claim 1 wherein said filter comprises a fine filter element safeguarded by a bypass and a coarse filter element connected in series to said fine filter element downstream in a direction of fluid flow through said filter.

7. A lubricating device according to claim 6 where said coarse filter has a filter fineness approximately five to ten times greater than a filter fineness of said fine filter element.

8. A lubricating device according to claim 1 wherein said filter comprises:
a filter housing having a longitudinal axis, having a housing wall coaxial to said longitudinal axis, and having a fluid inlet and a fluid outlet defining a flow direction therein, said fluid inlet extending laterally through said housing wall;
a first filter element within said filter housing extending along said longitudinal axis and having a first length essentially along an entire length of said filter housing;
a bypass device within said filter housing openable to allow flow in said flow direction without filtration through said first filter element; and
a second filter element within said filter housing and said first filter element downstream of said first filter element in said flow direction having a second length not greater than one-half of said first length, said second filter element having a top end cap lying essentially in one plane extending transversely to said longitudinal axis with a top end of said fluid inlet, said first filter element having a first end adjacent to and encompassing said bypass device and an opposite second end adjacent to and encompassing said second filter element with a radial distance therebetween, said second filter element having an end opposite said top end cap supported on a plate holder closing said fluid outlet except for a passage in said plate holder.

9. A lubricating device according to claim 1 wherein said filter comprises:
a filter housing having a longitudinal axis and having a fluid inlet and a fluid outlet defining a flow direction therein, said fluid inlet extending laterally through said filter housing;
a first filter element within said filter housing extending along said longitudinal axis and having a first length essentially along an entire length of said filter housing;
a second filter element within said filter housing and said first filter element downstream of said first filter element in said flow direction having a second length not greater than one-half of said first length, said second filter element having a top end cap lying essentially in one plane extending transversely to said longitudinal axis with a top end of said fluid inlet; and
a bypass device within said filter housing openable to allow flow in said flow direction without filtration through said first filter element, said bypass device being a bypass valve having a closing part movable between open and closed positions opening and closing a flow path from said fluid inlet to said second filter element without passing through said first filter element, respectively, and biased towards said closed position by a spring.

10. A lubricating device according to claim 1 wherein said filter comprises:
a filter housing having a longitudinal axis, having a housing wall coaxial to said longitudinal axis, and having a fluid inlet and a fluid outlet defining a flow direction therein, said fluid inlet extending laterally through said housing wall;
a first filter element within said filter housing extending along said longitudinal axis and having a first length essentially along an entire length of said filter housing;
a bypass device within said filter housing openable to allow flow in said flow direction without filtration through said first filter element; and
a second filter element within said filter housing and said first filter element downstream of said first filter element in said flow direction having a second length not greater than one-half of said first length, said second filter element having a top end cap lying essentially in one plane extending transversely to said longitudinal axis with a top end of said fluid inlet, said bypass device being a bypass valve having a closing part movable between open and closed positions opening and closing a flow path from said fluid inlet to said second filter element without passing through said first filter element, respectively, and biased towards said closed position by a spring.

* * * * *